Figure 1:
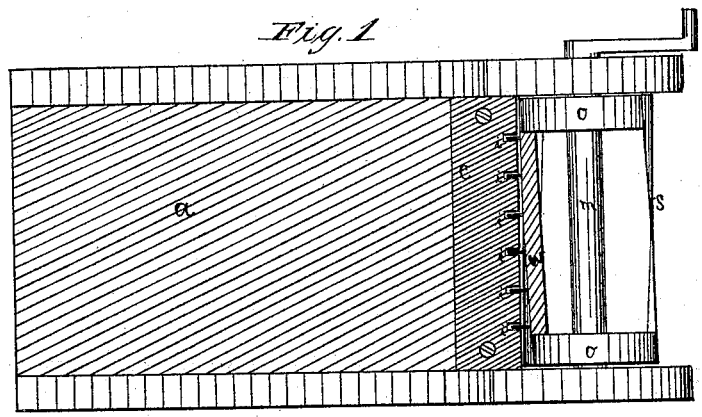

J. N. HILL.
Corn-Stalk Cutter.

No. 166,006. Patented July 27, 1875.

Witnesses:

Mrs. G. W. Low
E. L. Whiston

Inventor:

John N. Hill
by Bradford Howland
his Attorney.

UNITED STATES PATENT OFFICE.

JOHN N. HILL, OF CONCORD, NEW HAMPSHIRE, ASSIGNOR OF HIS RIGHT TO CHARLES G. PRESSEY, OF SAME PLACE.

IMPROVEMENT IN CORN-STALK CUTTERS.

Specification forming part of Letters Patent No. 166,006, dated July 27, 1875; application filed October 26, 1874.

*To all whom it may concern:*

Be it known that I, JOHN N. HILL, of Concord, in the county of Merrimack and State of New Hampshire, have invented a new and useful Improvement in Cutting-Boxes for cutting and splitting corn-stalks, of which the following is a specification:

This invention consists of a revolving knife, with its edge lengthwise of its axis, in combination with a series of short knives revolving on the same axis, but with their edges at right angles to the axis, as hereinafter fully described.

In the drawing forming a part of this specification, Figure 1 is a view of the top of the machine.

$a$ is the box, on which the stalks rest while being cut. $c$ is a plate attached to the box, with its front edge slotted for the knives $i$ to pass through. $m$ is a shaft, on which are the wheels $o$ $o$, to which are attached the knife $s$ and the bar $w$. The knife and bar may be attached to arms on the shaft instead of to the wheels $o$ $o$. The series of knives $i$ are attached to the bar $w$, with their blades pointing outward at right angles to the knife $s$ and the shaft $m$.

The machine is operated as follows: The stalks are placed in the box $a$, and fed forward to the knives. The ends of the stalks projecting to the edge of the slotted plate $c$ are split by the series of knives $i$, on the bar $w$, passing down through the slots of the plate as the shaft $m$ is revolved. The knife $s$, which follows the series of knives $i$, cuts off the ends of the stalks, which have been thus split by the series of knives $i$, and then the stalks are again fed forward, as before. Several knives, $s$, may be used with each one of them preceded by the series of knives $i$. If desired, the slotted plate $c$ may be reversed, and the bar $w$ placed nearer to the shaft $m$, so as to bring the points of the knives $i$ close to the edge of the plate $c$, which is not slotted; but in so doing the bar $w$ should be nicely adjusted, and the knives $i$ kept of exactly equal length, in order to split the stalks close to the edge of the plate $c$, where they are cut off by the knife $s$. When the knives $i$ are passed through the slots no such nicety of adjustment of the bar $w$ and equal length of the knives $i$ are required, and the ends of the stalks are split before they are fed far enough forward to be cut off by the knife $s$, and while they are supported by the plate $c$.

By thus splitting the stalks, as well as cutting them, they are made more suitable for fodder. The bar $w$ may also be removed, and a knife, $s$, put in its place, when the machine may be used for cutting straw and hay.

I claim as my invention—

The combination of the slotted plate $c$ with the series of knives $i$ and the knife $s$, substantially as and for the purpose herein set forth.

JOHN N. HILL.

Witnesses:
C. E. PRESSEY,
BRADFORD HOWLAND.